US011983502B2

(12) United States Patent
Shah et al.

(10) Patent No.: US 11,983,502 B2
(45) Date of Patent: May 14, 2024

(54) EXTRACTING FINE-GRAINED TOPICS FROM TEXT CONTENT

(71) Applicant: YAHOO AD TECH LLC, Dulles, VA (US)

(72) Inventors: Deven Santosh Shah, San Jose, CA (US); Sukanya Moorthy, Sunnyvale, CA (US); Topojoy Biswas, San Jose, CA (US)

(73) Assignee: YAHOO AD TECH LLC, New York, NY (US)

( * ) Notice: Subject to any disclaimer, the term of this patent is extended or adjusted under 35 U.S.C. 154(b) by 359 days.

(21) Appl. No.: 17/534,502

(22) Filed: Nov. 24, 2021

(65) Prior Publication Data

US 2023/0161964 A1 May 25, 2023

(51) Int. Cl.
| | |
|---|---|
| *G06F 40/284* | (2020.01) |
| *G06F 40/166* | (2020.01) |
| *G06F 40/30* | (2020.01) |
| *G06F 40/40* | (2020.01) |
| *G06N 3/08* | (2023.01) |
| *G06F 40/242* | (2020.01) |

(52) U.S. Cl.
CPC ............ *G06F 40/30* (2020.01); *G06F 40/166* (2020.01); *G06F 40/40* (2020.01); *G06N 3/08* (2013.01); *G06F 40/242* (2020.01); *G06F 40/284* (2020.01)

(58) Field of Classification Search
CPC ........ G06F 40/30; G06F 40/166; G06F 40/40; G06F 40/242; G06F 40/284; G06F 40/279; G06F 40/56; G06N 3/08; G06N 3/044; G06N 3/045; G06N 3/048; G06N 3/084; G06N 5/022
See application file for complete search history.

(56) References Cited

U.S. PATENT DOCUMENTS

| | | | |
|---|---|---|---|
| 11,762,990 B2* | 9/2023 | Gururajan | G06F 21/6227 726/23 |
| 11,861,314 B2* | 1/2024 | Pruksachatkun | G16H 10/40 |
| 2023/0100508 A1* | 3/2023 | Abobakr | G06F 40/295 704/9 |

* cited by examiner

*Primary Examiner* — Abul K Azad
(74) *Attorney, Agent, or Firm* — James J. DeCarlo; Greenberg Traurig, LLP

(57) ABSTRACT

The example embodiments are directed toward improvements in document classification. In an embodiment, a method is disclosed comprising generating a set of sentences based on a document; predicting a set of labels for each sentence using a multi-label classifier, the multi-label classifier including a self-attended contextual word embedding backbone layer, a bank of trainable unigram convolutions, a bank of trainable bigram convolutions, and a fully connected layer the multi-label classifier trained using a weakly labeled data set; and labeling the document based on the set of labels. The various embodiments can target multiple use cases such as identifying related entities, trending related entities, creating ephemeral timeline of entities, and others using a single solution. Further, the various embodiments provide a weakly supervised framework to train a model when a labeled golden set does not contain a sufficient number of examples.

20 Claims, 9 Drawing Sheets

EXTRACTING FINE-GRAINED TOPICS FROM TEXT CONTENT

BACKGROUND

The example embodiments are directed toward topic extraction and, more specifically, extracting topics from text content using a fine-grained high precision and high-recall topical classifier.

User interests are manifested in frequent or popular search queries and manifest as attributes or topics of relevant text documents (e.g., search results). Further, such text documents often include multiple attributes or topics. Using the example of a sports news database, many queries are directed toward rumors such as trade rumors, contract rumors, etc., while documents can frequently include multiple topics in the same document such as team or player performance, injury reports, trades, etc. While some attempts at structuring document content have been successful (e.g., structuring player or team statistics in a sports context), other attributes or topics (e.g., injury or trade rumors in a sports context) do not have a corresponding structured data source. Thus, there exists a need to perform fine-grained topic extraction on such unstructured attributes to surface these topics in a manner that can be queried.

BRIEF SUMMARY

In the example embodiments, a multi-label classifier is trained to predict topics for text content. The multi-label classifier can include a word embedding layer and multiple n-gram convolutional layers. The output of the n-gram convolutional layers can be concatenated and fed into one or more fully connected layers to generate predicted labels for a given sentence. Additionally, the example embodiments describe a training process wherein a seed set of sentences are generated using a combination of unsupervised clustering and manual topic or editorial labeling. Further, a training data set is generated using a weakly supervised sentence generation process. The model can be trained using the training data set and then fine-tuned or cross-validated using the seed data set, thus improving the performance of the model while only requiring a small number of training examples.

The following example embodiments solve the above-described problems by providing a single machine learning (ML) model that does not require significant human labeling of training examples. The example embodiments describe a lightweight classifier using convolutional layers trained on weakly supervised data. The classifier can be trained on sentence-level labels, enabling a better search experience. The example embodiments generate a weakly supervised data set by analyzing a smaller labeled data set using knowledge constraints such as entity presence consistency, lexicon-based consistency, and syntactic parsing consistency, ensuring a weakly supervised labeled data set. In some embodiments, the size of the data set can be increased by determining English back translations from Portuguese, French, and German language using pre-trained neural machine translation models. Back translation can assist in making the model biased towards the context rather than words present in the sentence by keeping the meaning of the sentences intact while changing the words by their synonyms or similar words, thus maintaining the semantic consistency of the original sentence.

In an embodiment, a method is disclosed comprising extracting a set of sentences based on a document; predicting a set of labels for each sentence using a multi-label classifier, the multi-label classifier including a self-attended contextual word embedding backbone layer, followed by the concatenation of a bank of trainable unigram convolutions and a bank of trainable bigram convolutions, and at least one fully connected layer, the multi-label classifier trained using a weakly labeled data set; and labeling the document based on the set of labels predicted on the sentences present in the document In an embodiment, the prediction pipeline includes generating the set of candidate sentences as the input to the classifier for prediction of topics from a target document (e.g., news articles) comprises splitting the document based on a split condition; linking a plurality of entities to their corresponding mentions included in the set of sentences; and discarding a first subset of the set of sentences that do not include an entity in the plurality of entities. In an embodiment, generating a set of sentences based on a document further comprises filtering the set of sentences based on a pre-configured length.

In an embodiment, predicting a set of labels for each sentence using a multi-label classifier comprises extracting self-attended word embeddings for a respective sentence in the set of sentences using the self-attended contextual word embeddings from the second last layer of the transformer-based Universal Sentence Encoder (or similar model); inputting the self-attended word embeddings to the bank of trainable unigram convolutions; inputting the self-attended word embeddings to the at least one bigram filter; and concatenating the first output from the at least one unigram filter with a second output from the at least one bigram filter to form a concatenated output.

In an embodiment, the method further includes inputting the concatenated output to at least one fully connected layer generating a set of labels for a given sentence. In an embodiment, the first output is input into a first max pooling layer, and the second output is input into a second max pooling layer prior to concatenating.

In some embodiments, the multi-label classifier can be trained using a training data set. In some embodiments, the training data set can be created by generating word embeddings for a set of sentences extracted from a corpus of documents (e.g., a previous year's news articles); sub-sampling the sentence embeddings using one or more clustering routines (e.g., unsupervised clustering technique applied on the pre-trained sentence embeddings or the sub-word embeddings of the sentence), the sub-sampling generating sub-samples of sentence embeddings; generating a test data set based on the sub-sampling; generating a training data set using a plurality of labeling functions based on knowledge constraints; training the multi-label classifier using the word embeddings extracted from the second last layer of the transfer-based Universal Sentence Encoder (or similar model) of the extracted training data; and cross-validating the multi-label classifier using the test data set.

In other embodiments, devices, computer-readable media, and systems are provided for executing the above methods. These and other embodiments are described more fully in the following description.

DETAILED DESCRIPTION

Figure 1:
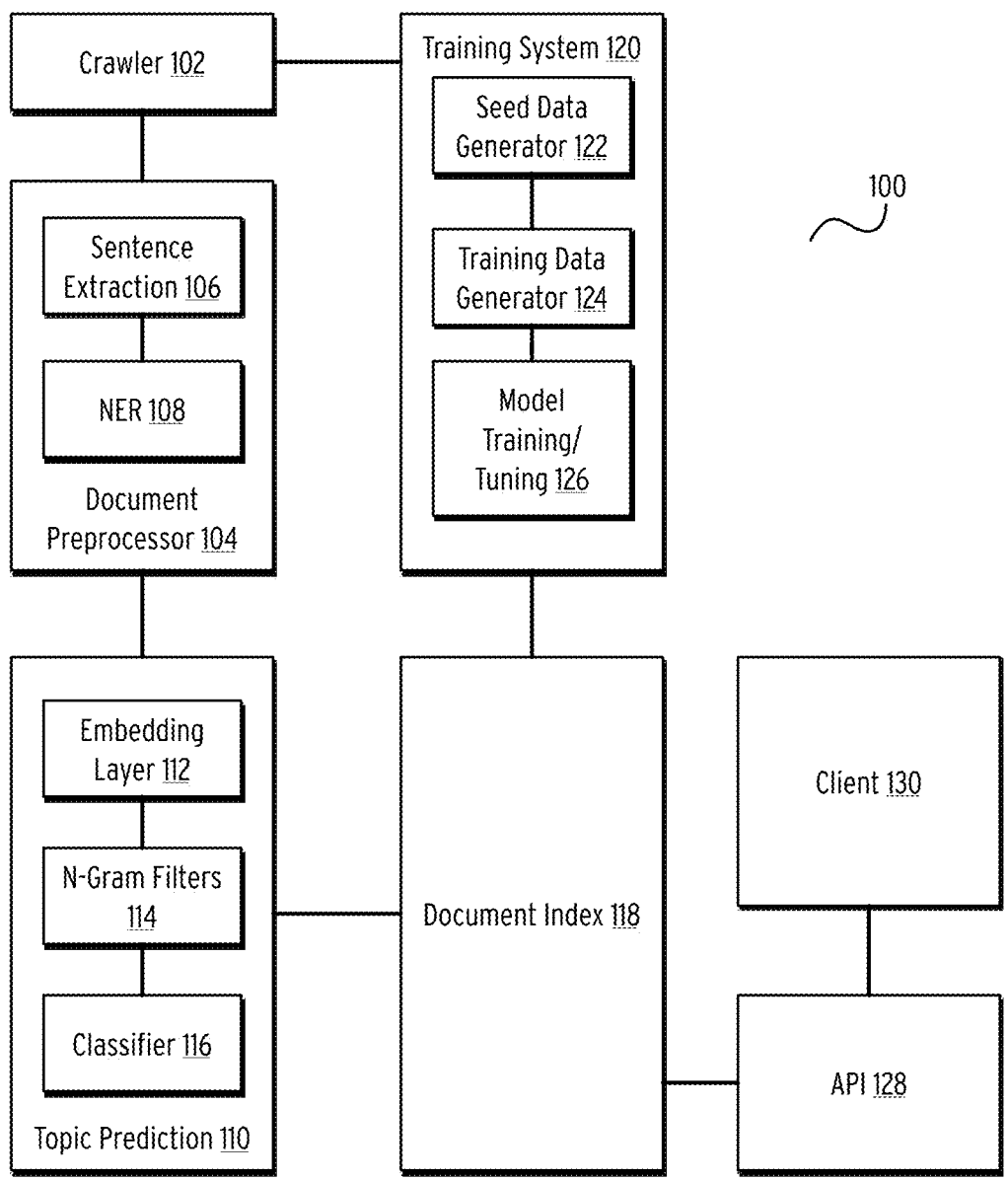
FIG. 1 is a block diagram illustrating a system for performing fine-grained topic recognition according to some of the example embodiments.

FIG. 1 is a block diagram illustrating a system for performing fine-grained topic recognition according to some of the example embodiments.

In the example embodiments, a system 100 includes a crawler 102, document preprocessor 104, topic prediction unit 110, document index 118, training system 120, application programming interface 128, and client device 130. In the illustrated embodiment, the document preprocessor 104 can include a sentence extraction subunit 106 and named entity recognition and entity linking subunit 108. In the illustrated embodiment, the topic prediction unit 110 can include an embedding layer 112, n-gram filters 114, and a classifier 116. In the illustrated embodiment, the training system 120 can include a seed data generator 122, a training data generator 124, and a model training and tuning subunit 126.

In the illustrated embodiment, crawler 102 can be used to retrieve documents from an external or internal repository of documents. The crawler 102 can crawl contextual news (e.g., sports, politics) articles based on certain lexicons present in the title of the article. In one embodiment, the contextual news articles can be pre-classified based on the content at a high level.

The crawler 102 feeds documents to document preprocessor 104 and training system 120. In the illustrated embodiment, the document preprocessor 104 can be configured to pre-process documents for ingestion by the topic prediction unit 110. In an embodiment, the document preprocessor 104 includes a sentence extraction subunit 106. In an embodiment, the sentence extraction subunit 106 can be configured to split the crawled documents into sentences. In one embodiment, the sentence extraction subunit 106 can parse the text content and split documents into sentences based on a predefined split condition. The sentence extraction subunit 106 transmits the sentences to entity recognition and entity linking subunit 108, which can identify entities in the sentences. In some embodiments, the entity recognition and entity linking subunit 108 can use named entity recognition (NER) or similar techniques to identify entities included in a given sentence. In one embodiment, the entity recognition and entity linking subunit 108 can identify name entities in each of the sentences. In one embodiment, any NER technique can be used to identify relevant entities in the sentences such as those found in the General Architecture for Text Engineering (GATE), OpenNLP, or spaCy platforms. In one embodiment, the entity recognition and entity linking subunit 108 can then determine if a given sentence includes an entity that is included in a preferred list of entities. For example, the topic prediction unit 110 can preload a set of desired entities and filter out those sentences that do not include the desired entity in them. The document preprocessor 104 egests sentences and corresponding entities to the topic prediction unit 110 for topic prediction.

The topic prediction unit 110 includes an embedding layer 112 that receives the sentences and generates word embeddings for the sentences. In an embodiment, embedding layer 112 can include a universal sentence encoder (or other language model such as BERT, RoBERTa, etc.) that receives a sentence as an input and generates a set of word embeddings. The topic prediction unit 110 further includes a bank of n-gram filters 114. In the illustrated embodiment, the n-gram filters 114 convolve word embeddings to generate a vector representing features of the word embeddings. This vector is then processed by the classifier 116 to generate a set of label predictions (and in some embodiments corresponding confidence levels) used for topic classifications.

Figure 2:
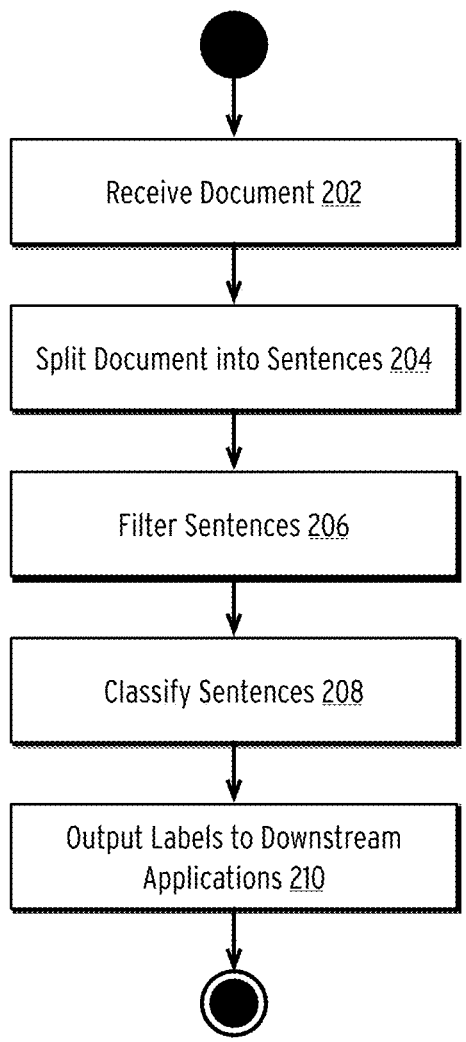
FIG. 2 is a flow diagram illustrating a method for predicting per-sentence labels of the document according to some of the example embodiments.
Figure 3:
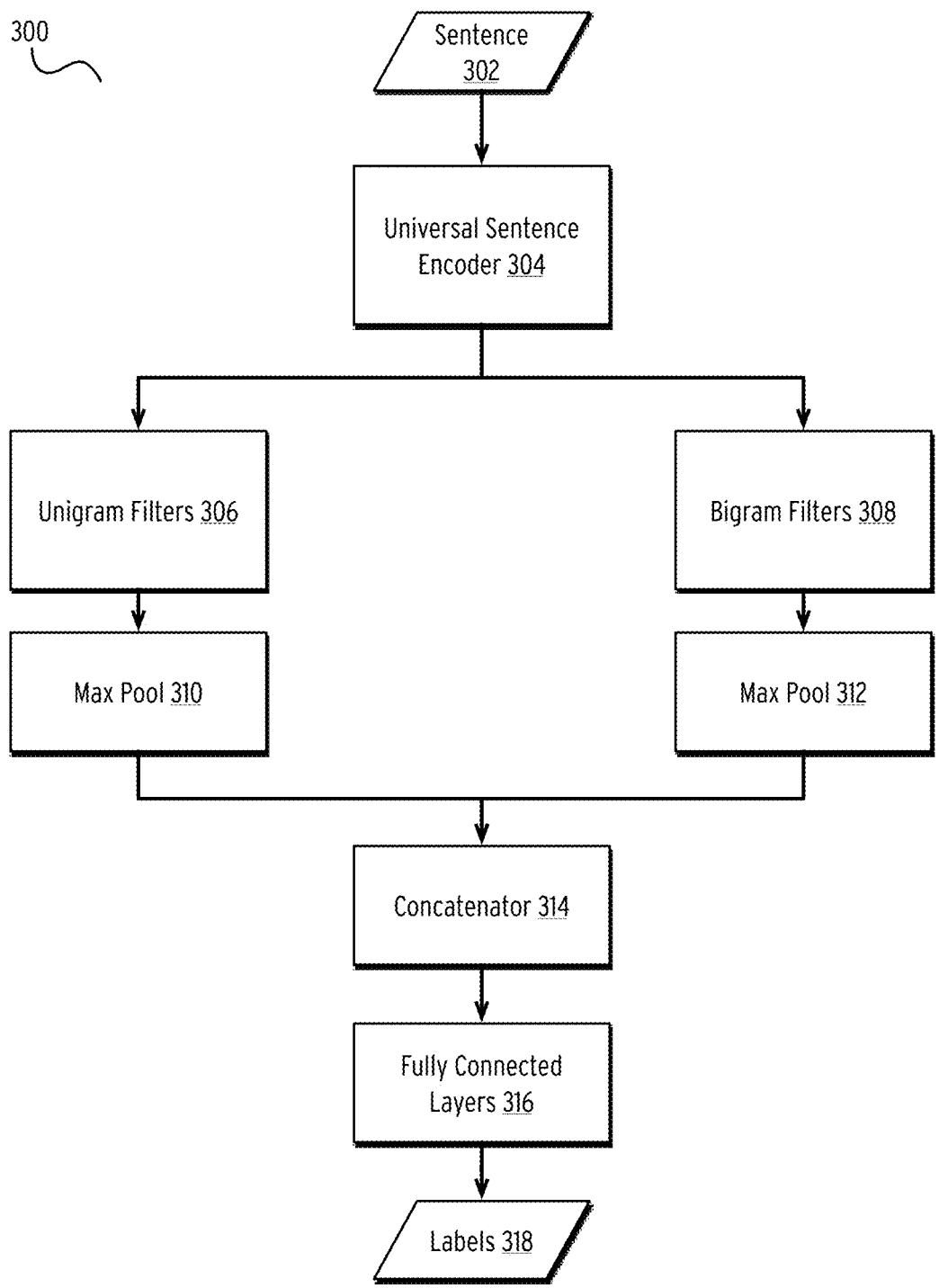
FIG. 3 is a block diagram of a multi-label classifier according to some of the example embodiments.
Figure 4:
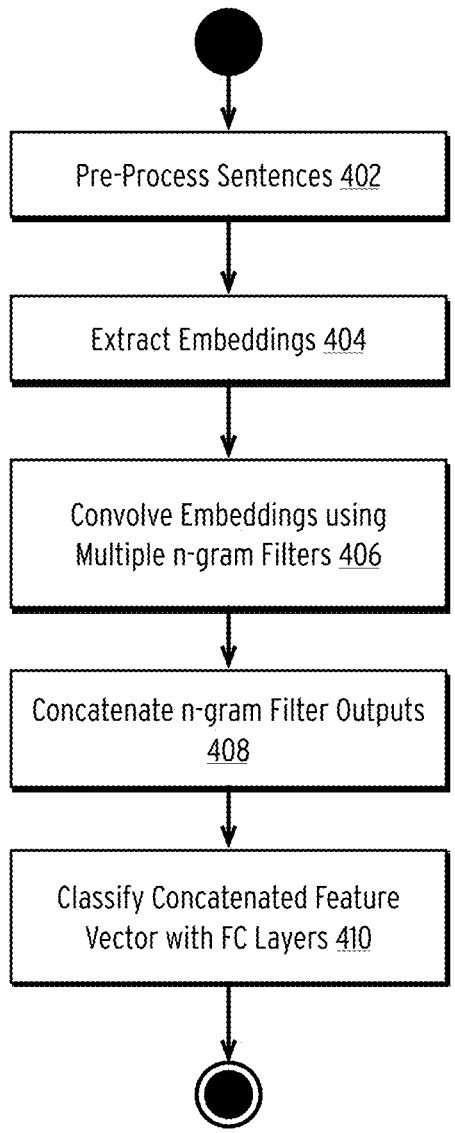
FIG. 4 is a flow diagram illustrating a method for classifying a sentence using a multi-label classifier according to some of the example embodiments.

Details of document preprocessor 104 and topic prediction unit 110 are described in further detail in FIGS. 2, 3, and 4, and the disclosure of those figures is not repeated herein.

After topic prediction, the topic prediction unit 110 writes the sentences and corresponding topics to document index 118. In an embodiment, the topic prediction unit 110 can also write the named entities to the document index 118. In some embodiments, the document index 118 can include one or more databases for storing articles, sentences, topics, entities, and the relationships therebetween. In the illustrated embodiment, the document index 118 can be queried via an application programming interface 128. In one embodiment, the application programming interface 128 can comprise a GraphQL or representational state transfer (REST) interface. In the illustrated embodiment, a client device 130 can issue queries to the document index 118 via the application programming interface 128. For example, the client device 130 can search the document index 118 for entities or topics. In an embodiment, the client device 130 can also retrieve articles from document index 118 and receive the entities and topics generated by the topic prediction unit 110.

In the illustrated embodiment, system 100 further includes a training system 120. The training system 120 includes a seed data generator 122 that can generate seed data used for testing a machine learning model. Details of the operation of seed data generator 122 are provided in the description of FIG. 6, which is not repeated herein. The training system 120 includes a training data generator 124 that can generate training data used for training a machine learning model. Details of the operation of training data generator 124 are provided in the description of FIG. 7, which is not repeated herein. During training, the subunit 126 can train a machine learning model using the training data generated by training data generator 124 and can validate the model hyperparameters using the seed data from seed data generator 122. Details of these processes are described more fully in FIGS. 5 and 8, which are not repeated herein.

FIG. 2 is a flow diagram illustrating a method for predicting labels for documents according to some of the example embodiments.

In step 202, the method can include receiving a document. In one embodiment, a document comprises a file including text. In some embodiments, the file can include other content such as images, video, etc. In some embodiments, the method can extract the text from the file and generate a document from the extracted text. As one example, a document can comprise an article or other published content. The specific content of the document is not limited, and the example embodiments can operate on content from various domains (e.g., sports, politics, etc.).

In step 204, the method can include splitting the document into sentences. In one embodiment, the method can include parsing the text content and splitting the document into sentences based on a predefined split condition. For example, the method can split the text into sentences by splitting the text at every combination of periods and one or more spaces (e.g., using the regular expression /\.\s+/). Other techniques may be used.

In step 206, the method can include filtering the sentences identified in step 204. In one embodiment, the method can employ one or more filters to reduce the number of sentences classified in step 208 using the length of the sentence, content of sentence.

In one embodiment, the method can identify named entities in each of the sentences. In one embodiment, any named entity recognition (NER) technique can be used to identify relevant entities in the sentences such as those found in the General Architecture for Text Engineering (GATE), OpenNLP, or spaCy platforms. In one embodiment, the method can then determine if a given sentence includes an entity that is included in a preferred list of entities. For example, the method can preload a set of desired entities and filter out those sentences that do not include the desired entity in them.

In another embodiment, the method can filter sentences based on the length of the sentence. For example, sentences that have words less than four, or greater than one hundred words, can be discarded. In a sports context, such sentences may only mention the age of the player, or assists made by the player, or are ill-formed; similarly, sentences having large a number of words normally include a list of players in the roster of a team. Since this type of information can be obtained from a structured text and is not relevant to deep topic extraction, hence in some embodiments, the method can discard them. Similar examples exist in other domains (e.g., lists of donors in political articles). In this embodiment, the number of word thresholds can be changed to improve the performance of the model as desired.

In step 208, the method can include classifying the filtered sentences. In one embodiment, the method can classify the filtered sentences using a multi-label classifier. In an embodiment, the multi-label classifier can include a self-attended contextual word embedding backbone layer, a bank of trainable unigram convolutions, and at least one bigram filter. Details of the multi-label classifier are provided in FIGS. 3 and 4 and not repeated herein. In brief, the multi-label classifier outputs a set of labels or categories and a corresponding confidence value. In some embodiments, the confidence value can be optional.

In step 210, the method can output the labels generated by the classifier to one or more downstream applications. In one embodiment, step 210 can comprise storing the labels as categories or topics associated with a given article. In some embodiments, the method can output all generated labels or may select a subset of the generated labels. In an embodiment, the method can select the labels having the highest confidence as the outputted labels.

Various downstream applications can utilize the labels, and the disclosure is not limited to specific applications.

In an embodiment, the downstream application can perform topical extractive summarization. For example, given a topic predicted using the method of FIG. 2 and an entity, a set of representative sentences can be selected from a document (e.g., sports news article) pertaining to the topics of interest (e.g., rumors) even though they are deeply embedded in the article.

In an embodiment, the downstream application can perform trending topical related entities recommendation. In such an embodiment, the predicted labels or topics facilitate mining of relatedness (e.g., based on fine-grained topics) between entities (e.g., players and teams in a sports context) along with provenance information (e.g., sentences from which the method extracts the topic). In some embodiments, the method of FIG. 2 can be complementary to existing methods of mining encyclopedic relatedness from knowledge graphs.

In an embodiment, the downstream application can be used to generate an ephemeral timeline of entities. In a sports example, using the mined topics (e.g., rumors) along with the corresponding entities (e.g., linked players and teams) in the sentences, a downstream application can create a topical timeline of the entities, with extracted sentences representing topics or aspects about the entities (e.g., players or teams).

In an embodiment, the downstream application can perform fine-grained content understanding for personalized news recommendations. In such an embodiment, the fine-grained topics mined at a sentence level along with related entities (e.g., players and teams in a sports context), can assist in creating more dimensions of user interests when users click and view articles (e.g., more fine-grained than article-level classification or knowing that the user may be interested in specific players or teams), because now the articles can be dissected based on mined fine-grained topics.

In an embodiment, the downstream application can perform search query triggering. Since the method of FIG. 2 mines evidence sentences in documents for topics that were also frequently found in "entity aspect" queries, it can enable high recall, document mining for the entity queries. This enriches capabilities to surface deep facts and utilize a document pool better.

FIG. 3 is a block diagram of a multi-label classifier according to some of the example embodiments.

In the illustrated embodiment, a multi-label classifier 300 receives a sentence 302 as an input. In an embodiment, sentence 302 can comprise a filtered sentence as described in the description of FIG. 2.

The multi-label classifier 300 further includes a self-attended word embeddings 304 that receives sentence 302 as an input and generates a set of word embeddings. In one embodiment, the multi-label classifier 300 can extract word embeddings from the second last layer of a pre-trained transformer-based universal sentence encoder (or similar model). In an embodiment, the self-attended contextual word embeddings output by the self-attended word embeddings 304 are treated as features of the words in latent space.

In the illustrated embodiment, the self-attended word embeddings 304 (e.g., a universal sentence encoder) encodes text into high dimensional vectors that can be used for text classification, semantic similarity, clustering, and other natural language tasks.

The self-attended word embeddings 304 can be trained and optimized for greater-than-word length text, such as sentences, phrases, or short paragraphs. The self-attended word embeddings 304 can be trained on a variety of data sources and a variety of tasks with the aim of dynamically accommodating a wide variety of natural language understanding tasks. In some embodiments, the input to the self-attended word embeddings 304 can comprise a variable-length text and the output comprises a high-dimensional vector. In some embodiments, the self-attended word embeddings 304 can be trained with a deep averaging network (DAN) encoder.

In the illustrated embodiment, the word embeddings extracted from self-attended word embeddings 304 are passed independently to unigram filters 306 and bigram filters 308. In an embodiment, the unigram filters 306 and bigram filters 308 comprise convolutional networks. In an embodiment, both a bank of trainable unigram convolutions (unigram filters 306) and bank of trainable bigram convolutions (bigram filters 308) comprise convolutional filters that generate features of a given sentence. However, unigram filters 306 consider each word of the sentence individually, while bigram filters 308 consider two words at a time in a given sentence. Higher-dimensional filters (i.e., trigram, or generally n-gram) may additionally be used in some embodiments. In some embodiments, the multi-label classifier 300 can utilize 128 convolution filters per gram (i.e., 128 convolutional filters for unigrams and 128 for bigrams). In the illustrated embodiment, the unigram filters 306 and bigram filters 308 slide over each word or word pair in the sentence and convolve the sentence into a set of features. In some embodiments, the unigram filters 306 and bigram filters 308 can include multiple convolutional filters or, in some embodiments, a single convolutional filter. In some embodiments, the unigram filters 306 and bigram filters 308 can include a final rectified linear unit (ReLu) to linearize the output of the convolutional filter layers.

In the illustrated embodiment, the output of unigram filters 306 are pooled via max pooling layer 310 and the output of the bigram filters 308 are pooled via max pooling layer 312. In some embodiments, average pooling layers can be used in lieu of max pooling layers. In the illustrated embodiment, the max pooling layers perform a max pooling operation on the convolutional outputs of unigram filters 306 and bigram filters 308 and generate corresponding feature vectors for unigram filters 306 and bigram filters 308.

In the illustrated embodiment, the output of max pooling layer 310 and max pooling layer 312 are concatenated via concatenator 314. In the illustrated embodiment, the concatenator can concatenate the output of max pooling layer 312 to the output of max pooling layer 310 (or vice versa) to generate a feature vector.

In the illustrated embodiment, the feature vector generated by concatenator 314 is input into fully connected layers 316. In the illustrated embodiment, the fully connected layers 316 can comprise one or more fully connected feed-forward neural network layers. In an embodiment, the fully connected layers 316 can comprise two fully connected layers trained for multi-label classification (as described herein) into predefined topical labels 318. The specific number of fully connected layers is not limiting, and additional fully connected layers may be utilized. In some embodiments, the fully connected layers 316 can include a sigmoid activation layer as a final layer that projects the output of the fully connected layers 316 to a t-dimensional vector t, where t is the total number of topics or labels to classify.

FIG. 4 is a flow diagram illustrating a method for classifying a sentence using a multi-label classifier according to some of the example embodiments. Various details regarding the structure of the classifier were described in connection with FIG. 3 and are not repeated herein.

In step 402, the method can include pre-processing sentences. In an embodiment, the pre-processing can comprise splitting each sentence into words. In some embodiments, the method can then pad the sentence with a special character in case the sentence is short (e.g., less than one hundred words).

In step 404, the method can include extracting embeddings from the sentence. As discussed in FIG. 3, the method can utilize self-attention-based sentence or word embeddings to extract word embeddings for a given sentence. In some embodiments, contextual self-attended word embeddings of these words can be extracted from the second last layer of a pre-trained transformer-based sentence embedding model. In some embodiments, these self-attended contextual word embeddings can be treated as features of the words in latent space. In existing systems, part of speech (POS) tags of the words, dependency parsed tree of the sentence was treated as features of the sentence. However, since the method uses a self-attention transformer-based universal sentence encoder (or similar model), these features get embedded in the word embeddings itself.

In step 406, the method can include convolving the word embeddings using a plurality of n-gram filters. In the illustrated embodiment, the n-gram filters output a feature map of word features included in a sentence. In one embodiment, the method can comprise inputting the word embeddings into a bank of trainable unigram convolutions and a bank of trainable bigram convolutions. In one embodiment, the outputs of the unigram convolutions and bigram convolutions can be input into a fully connected layer and the output of the fully connected layer pooled using a max pooling layer or average pooling layer.

In step 408, the method can include concatenating the outputs of the n-gram filters. In one embodiment, the method can combine the outputs of the n-gram filters into a single feature vector suitable for classification using a fully connected layer or multiple fully connected layers. In one embodiment, the method can comprise concatenating the output of a bank of trainable bigram convolutions to the output of a bank of trainable unigram convolutions.

In step 410, the method can include classifying the concatenated vector using one or more fully connected layers. In one embodiment, the one or more fully connected layers comprise two fully connected layers; however, the specific number of layers is not limiting.

Figure 5:
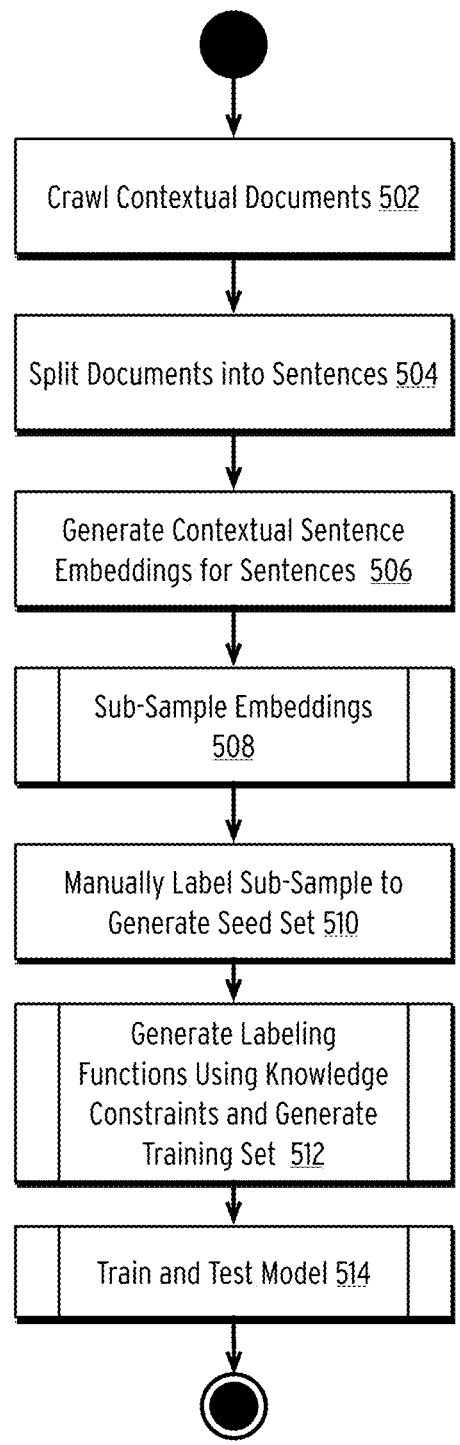
FIG. 5 is a flow diagram illustrating a method for generating a training data set for a multi-label classifier according to some of the example embodiments.

FIG. 5 is a flow diagram illustrating a method for generating a training data set for a multi-label classifier according to some of the example embodiments.

In step 502, the method can include crawling contextual documents. In the illustrated embodiment, contextual news (e.g., sports, politics) articles are crawled based on certain lexicons present in the title of the article. In one embodiment, the contextual news articles can be pre-classified based on the content at a high level.

In step 504, the method can include splitting the crawled documents into sentences. In one embodiment, the method can include parsing the text content and splitting the document into sentences based on a predefined split condition. For example, the method can split the text into sentences by splitting the text at every combination of periods and one or more spaces (e.g., using the regular expression /\.\s+/). Other techniques may be used.

In step 506, the method can include generating contextual sentence embeddings for sentences. As discussed in FIG. 3, the method can utilize a transformer-based sentence embedding model to extract sentence embedding for a given sentence. In some embodiments, contextual self-attended sentence embeddings of these sentences can be extracted from the last layer of a pre-trained transformer-based universal sentence encoder model. In some embodiments, these self-attended contextual sentence embeddings can be treated as features of the words in latent space. In existing systems, POS tags of the words, dependency parsed tree of the sentence was treated as features of the sentence. However, since the method uses a self-attention transformer based universal sentence encoder (or similar model), these features get embedded in the sentence embeddings itself. In some embodiments, the same universal sentence encoder used during prediction (e.g., in FIGS. 2 through 4) can be used during training data generation.

In step 508, the method can include sub-sampling the sentence embeddings. Details of step 508 are provided in the description of FIG. 6, which is not repeated herein for the sake of clarity. In brief, the sub-sampling procedure in FIG. 6 generates batches of similar sentence embeddings (i.e., sentences) for manual inspection.

In step 510, the method can include manually labeling the sub-sampled sentences corresponding to subsampled sentence embeddings. In one embodiment, the method can comprise manually labeling each batch of sentence embeddings (and/or each cluster within a batch) via topical labels from a set of pre-defined labels. In some embodiments, the corresponding human-readable sentences are provided for manual review in lieu of the sentence embeddings. In an embodiment, the method retrieves a batch of a fixed number of sentences, which requires a fixed time to label humanly. Subsequent batches can be selected based on the uncertainty of labels identified automatically (e.g., by calculating statistics from completed batches) to compose the different clusters. In some embodiments, the method can include manually labeling a small set of sentences and a small set of labels. For example, the method can comprise labeling 3,000 representative sentences with eighteen different hierarchical topics. As next discussed, this small manually labeled group can be used as a seed to test model training.

In step 512, the method can include generating labeling functions using knowledge constraints. In some embodiments, the method uses knowledge constraints to weakly-label a larger set of training examples. Thus, in step 512, the method propagates these labels to unlabeled sentences to generate a training set by developing labeling functions using various knowledge constraints as a weak supervision technique. Details of step 512 are provided in the description of FIG. 7, which is not repeated herein for the sake of clarity.

In step 514, the method trains a machine learning model (e.g., multi-label classifier 300) using training data generated using the labeling functions and then tests the model using the seed examples. Details of step 514 are provided in FIG. 8 and are not repeated herein.

Figure 6:
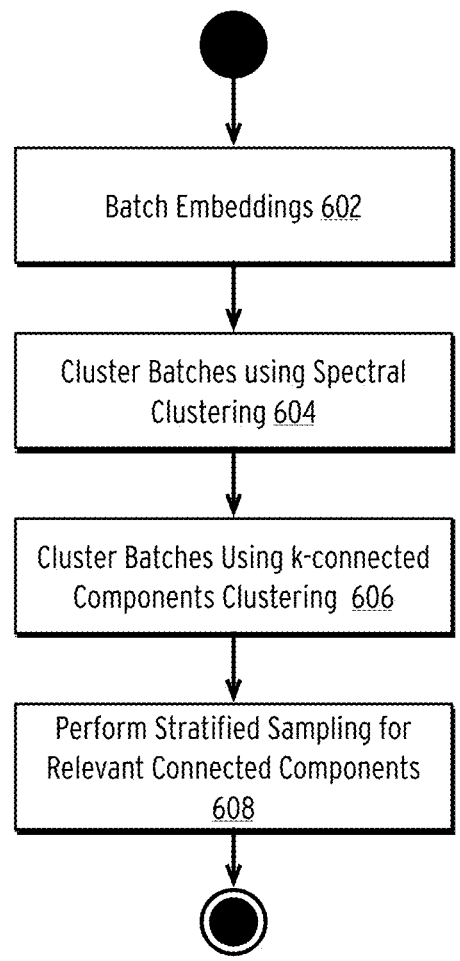
FIG. 6 is a flow diagram illustrating a method for subsampling sentence embeddings according to some of the example embodiments.

FIG. 6 is a flow diagram illustrating a method for sub-sampling sentence embeddings according to some of the example embodiments.

In step 602, the method can include batching embeddings. As discussed in connection with FIG. 5, a training data generation process can extract sentences from contextual documents and generate contextual sentence embedding for each sentence using output of the last layer of universal sentence encoder (or similar model). As a result, the process can generate a large number of sentence embeddings. In an embodiment, the method of FIG. 6 splits the set of sentence embeddings into batches of fixed sizes (e.g., 1024 vectors) for computational efficiency. Further, in some embodiments, the use of batching enables clustering based on local neighbors, as discussed further herein.

In step 604, the method can include clustering each batch of sentence embeddings using a spectral clustering routine. In an embodiment, spectral clustering is capable of handling complex clustering since the clustering is done by spectral decomposition of a graph into subgraphs, where the nodes or data points are the sentences. In some embodiments, spectral clustering can be used to ease the calculation of intra-sentence distances (e.g., cosine distances) and finding graph neighborhoods.

In step 606, the method can include clustering batches using k-connected components clustering routine. In some embodiments, the use of a second stage clustering (e.g., k-connected components) can create tighter clusters and move outliers into separate clusters. Thus, in some embodiments, the method can generate k-connected components on each of the spectral clusters formed in step 604. Since the method operates on pre-trained sentence embeddings, in step 606, the method breaks seemingly "close by" sentences into tight-knit segments. As a result, the output of step 606 clusters sentences with very similar words and syntax.

In step 608, the method can include performing stratified sampling for relevant connected components.

In an embodiment, the densely connected top components in each cluster are manually checked for task relevance. For example, the top twenty densely connected components can be manually checked for relevancy to a given task. In an embodiment, densely connected sentences in each connected component can be identified by calculating the cosine similarity of their embeddings with every sentence in that connected component and identifying a count of highly connected sentences (e.g., having a cosine similarity greater than a preconfigured threshold, such as 0.70) to that sentence. In some embodiments, the preconfigured threshold can be adjusted based on the observed performance of the method or tuned as a parameter of the method.

Next, sentences in each connected component can be sorted based on their count of connectedness to the rest of the sentences in the cluster. Finally, the method can include selecting representative sentences by stratified sampling from different connected component clusters (e.g., based on their population size). The sentences selected can then be utilized as the sub-sample processed in FIG. 5.

Figure 7:
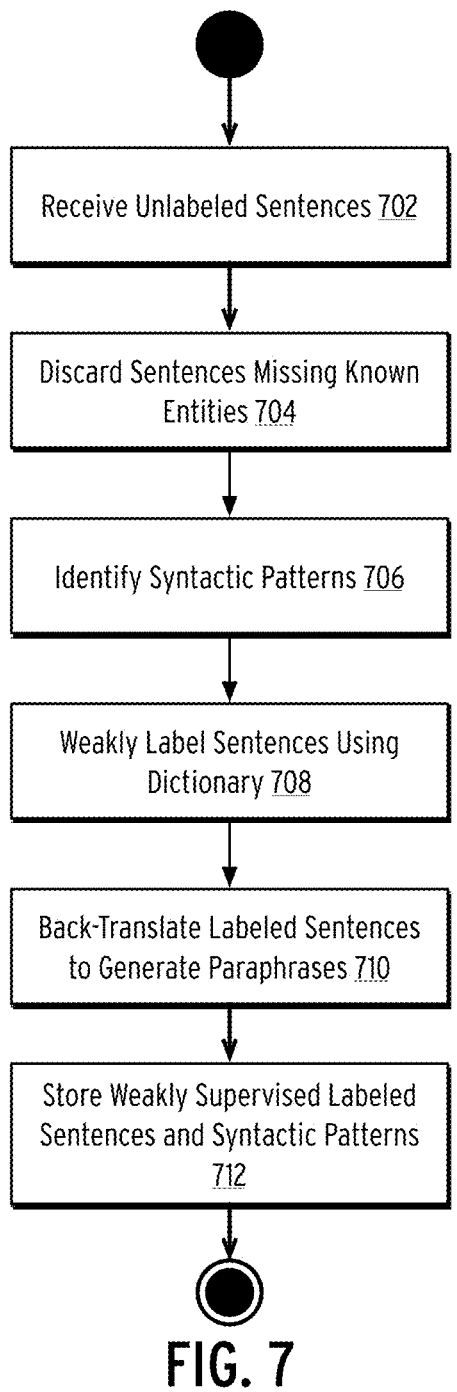
FIG. 7 is a flow diagram illustrating a method for generating labeling functions using knowledge constraints according to some of the example embodiments.

FIG. 7 is a flow diagram illustrating a method for generating labeling functions using knowledge constraints according to some of the example embodiments.

In step 702, the method can include receiving unlabeled sentences. In one embodiment, the unlabeled sentences can comprise any of the sentences retrieved in step 502.

In step 704, the method can include discarding sentences in the unlabeled sentences that do not include entities stored in a known entity list. In an embodiment, entities can be detected using a lexicon of known entities. For example, a sports lexicon can include player and team entities (e.g., names) as well as other similar types of lexicons. In this manner, pattern matching can be used to determine if a given sentence includes an entity. In an alternative embodiment, the method can use NER techniques to automatically identify entities present in the sentence. In step 704, those sentences not including a known entity are, essentially, deemed irrelevant to training and thus removed from the smaller subset of seed examples.

In step 706, the method can include identifying syntactic patterns in the unlabeled sentences. In an embodiment, the method can comprise identifying syntactic patterns of the sentences present in different topics, by using a constituency parser on the sentences. For example, the method can comprise using a pre-trained Stanford Constituency parser. One example of such a pattern in a sports context includes: "Noun Phrase-player name-contract-Noun Phrase." For sentences matching pre-defined syntactic patterns, the method can automatically label the sentence using a predefined mapping of patterns to labels. For example, the above example can be mapped to a label of "contract discussions."

In step 708, the method can include weakly labeling the sentences using a dictionary-based approach. In an embodiment, the method can utilize a generated dictionary of trigger words for each label or topic to weakly classify the sentence into different categories based on the presence of the word in the sentence. Similar to step 704, in some embodiments, a pattern matching operation can be used to perform this classification. In some embodiments, the keywords in the dictionary can be manually identified and expanded using the synonyms, hyponyms and hypernyms present in a publicly available (e.g., Wordnet) dictionary.

In step 710, the method back-translates the sentences labeled using constraints in steps 704, 706, and 708. In one embodiment, back-translating refers to translating a sentence to another language and then back to the original language. For example, an English sentence can be translated to French, and the French translation can be translated back to English. In some embodiments, the method can back-translate each sentence using multiple languages to generate multiple versions of the same sentence. In some embodiments, the method can utilize machine learning-based translation capabilities to generate the translations. For example, the sentences can be back-translated to English from Portuguese, French, and German language using publicly available pre-trained Neural Machine Translation models provided by the OpenNMT library. The use of back-translation helps to increase the number of labeled sentences by keeping the semantics of the sentence intact but changing the words present in the sentences due to the use of automatic translation. In an embodiment, the method applies the label of an original sentence to all back-translations to increase the size of a training set.

In step 712, the method can include storing weakly supervised labeled sentences and syntactic patterns. As discussed in connection with FIG. 8 this training data can be used to train a machine learning model (e.g., multi-label classifier 300) which can then be tested using seed data.

Figure 8:
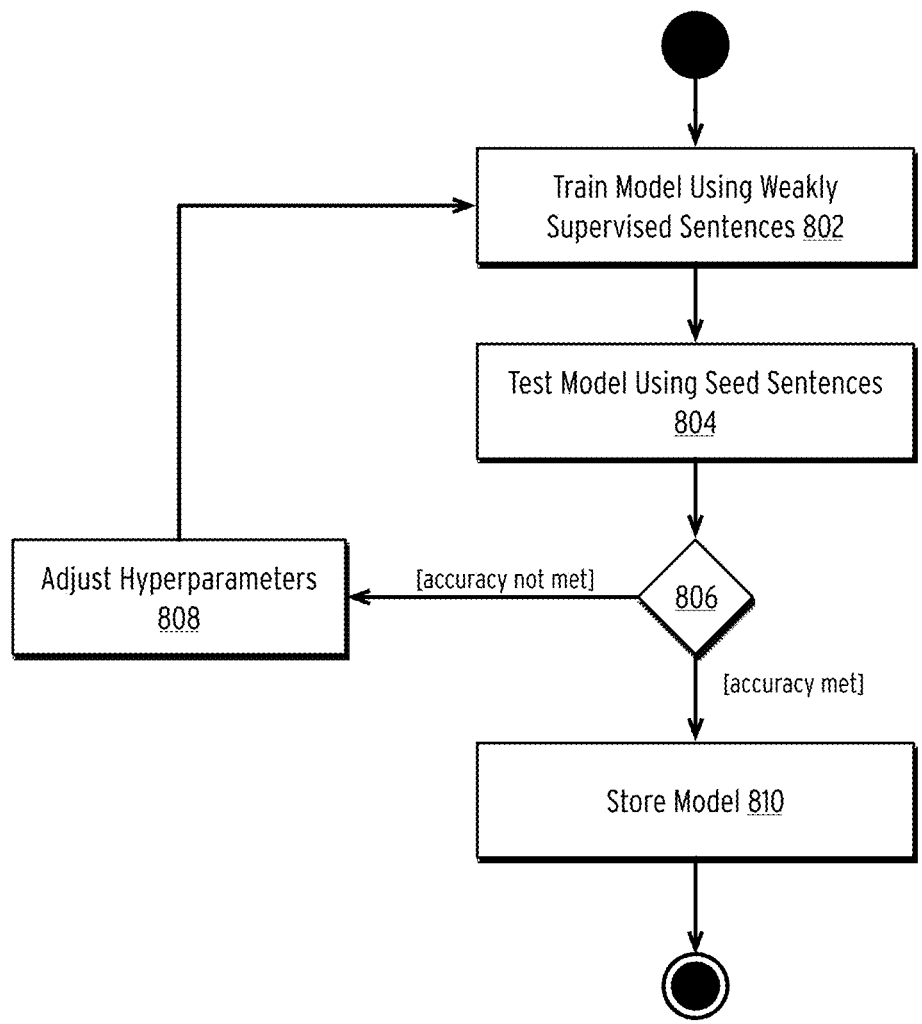
FIG. 8 is a flow diagram illustrating a method for using weakly supervised training data and seed data to tune a machine learning model according to some of the example embodiments.

FIG. 8 is a flow diagram illustrating a method for using weakly supervised training data and seed data to tune a machine learning model according to some of the example embodiments.

In step 802, the method can include training a machine learning model (e.g., multi-label classifier 300) using the weakly supervised training data generated using the processes described in FIG. 7. In an embodiment, the method can use a binary cross-entropy loss and convert the set of labels per sentence into multi-label binarized vectors. In some embodiments, the method can use Adam as the gradient descent method. Various alternative training processes can be used. During the training, the method updates various weights used by the model (e.g., neuron weights) based on comparing the predicted labels to the labels generated using the weakly supervised training data generation process of FIG. 7.

In step 804, the method tests the trained model using the seed examples generated using the process depicted in FIG. 6. In the illustrated embodiment, the method can use a cross-validation strategy to feed the test data to the trained model and compare the predicted output to the manual label of the seed examples. Various cross-validation strategies can be used such as holdout cross-validation and K-Fold cross-validation.

In step 806, the method can determine if the accuracy of the model in predicting the manually-provided labels meet a desired accuracy threshold. If not, the method adjusts the hyperparameters in step 808 and re-trains the model in step 802. In some embodiments, the method can use a grid search algorithm or similar algorithm to determine the appropriate adjustment to hyperparameters. The specific hyperparameters may depend on the underlying structure of the model (e.g., multi-label classifier 300) and are not intended to be limiting.

In step 810, after the method determines that the accuracy of the model meets the desired accuracy threshold, the method proceeds to store the model. In some embodiments, the storing of the model can comprise storing the weights and/or hyperparameters used to train the model. Once stored, these model parameters can be used to execute the model on live data as described in FIG. 2.

Figure 9:
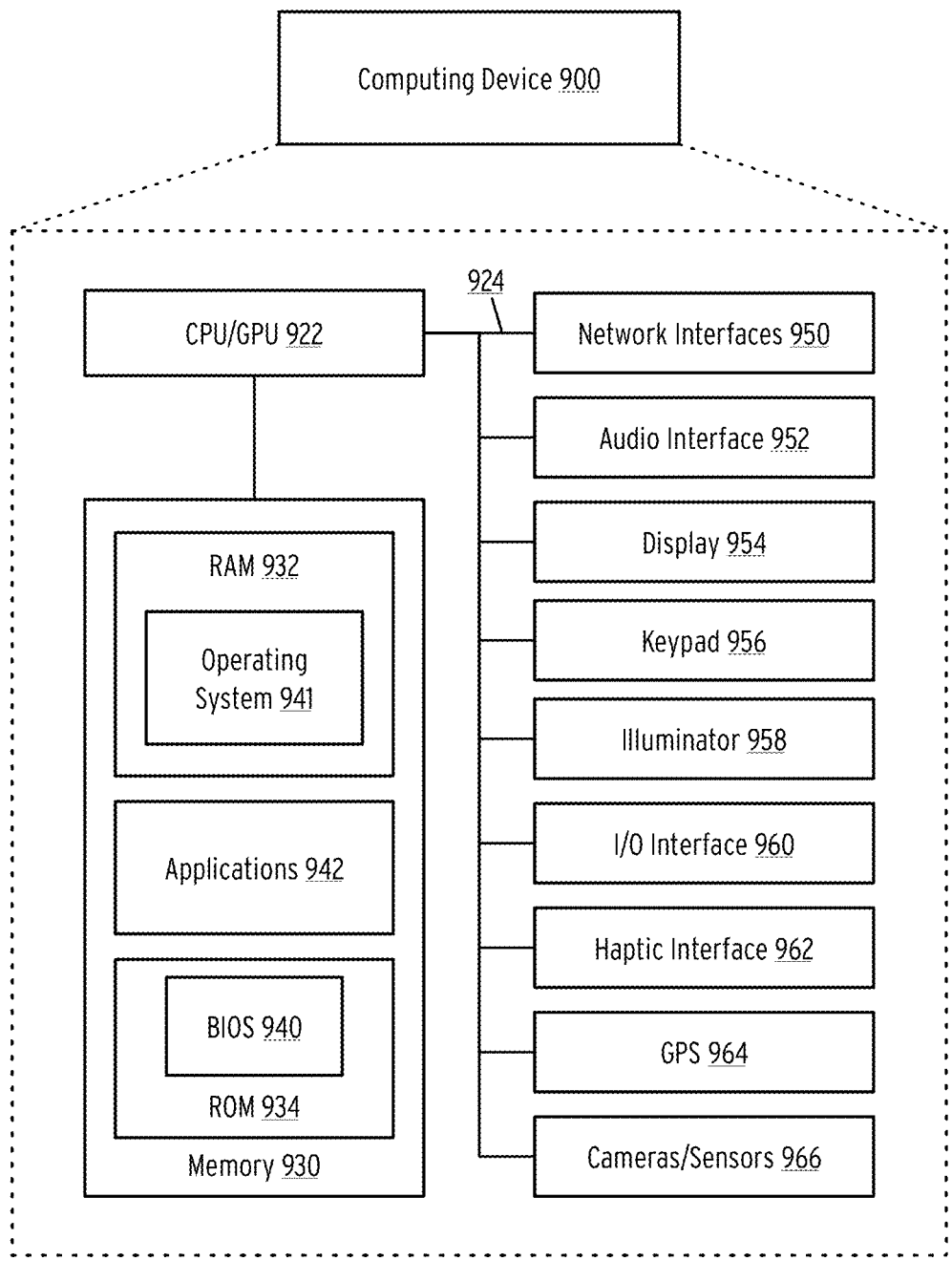
FIG. 9 is a block diagram illustrating a computing device showing an example embodiment of a computing device used in the various embodiments of the disclosure.

FIG. 9 is a block diagram illustrating a computing device showing an example embodiment of a computing device used in the various embodiments of the disclosure. The computing device 900 may include more or fewer components than those shown in FIG. 9. For example, a server computing device may not include audio interfaces, displays, keypads, illuminators, haptic interfaces, global positioning system (GPS) receivers, cameras, or sensors.

As shown in the figure, the computing device 900 includes a processing unit (CPU) or graphics processing unit (GPU) 922 in communication with a mass memory 930 via a bus 924. In some embodiments, computing device 900 can include both a CPU and GPU. The computing device 900 also includes one or more network interfaces 950, an audio interface 952, a display 954, a keypad 956, an illuminator 958, an input/output interface 960, a haptic interface 962, a GPS receiver 964 and sensors 966 such as a camera(s) or other optical, thermal, or electromagnetic sensors. Computing device 900 can include one camera/sensor, or a plurality of cameras/sensors, as understood by those of skill in the art. The positioning of the sensors 966 on the computing device 900 can change per computing device 900 model, per computing device 900 capabilities, and the like, or some combination thereof.

The computing device 900 may optionally communicate with a base station (not shown), or directly with another computing device. The one or more network interfaces 950 are sometimes known as transceivers, transceiving devices, or network interface card (NIC) devices.

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a stylus or a digit from a human hand.

Keypad 956 may comprise any input device arranged to receive input from a user. Illuminator 958 may provide a status indication or provide light.

The computing device 900 also comprises input/output interface 960 for communicating with external devices, using communication technologies, such as USB, infrared, Bluetooth®, or the like. The haptic interface 962 provides tactile feedback to a user of the client device.

GPS receiver 964 can determine the physical coordinates of the computing device 900 on the surface of the Earth, which typically outputs a location as latitude and longitude values. GPS receiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 may through other components, provide other information that may be employed to determine a physical location of the device, including, for example, a MAC address, Internet Protocol (IP) address, or the like.

Mass memory 930 includes a RAM 932, a ROM 934, and other storage means. Mass memory 930 illustrates another example of computer storage media for storage of information such as computer-readable instructions, data structures, program modules, or other data. Mass memory 930 stores a basic input/output system ("BIOS") such as BIOS 940 for controlling the low-level operation of the computing device 900. The mass memory also stores an operating system 941 for controlling the operation of the computing device 900 Applications 942 may include computer-executable instructions which, when executed by the computing device 900, perform any of the methods (or portions of the methods) described previously in the description of the preceding Figures. In some embodiments, the software or programs implementing the method embodiments can be read from hard disk drive (not illustrated) and temporarily stored in RAM 932 by CPU or GPU 922. CPU or GPU 922 may then read the software or data from RAM 932, process them, and store them to RAM 932 again.

The disclosure includes various devices which perform the methods and implement the systems described above, including data processing systems which perform these methods, and computer-readable media containing instructions which when executed on data processing systems cause the systems to perform these methods. In the illustrated embodiment, some methods (or steps thereof) are described as being performed by specific hardware or software components. However, no limitation is placed on which devices or software perform the described functionality.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

In this description, various functions and operations may be described as being performed by or caused by software code to simplify description. However, those skilled in the art will recognize what is meant by such expressions is that the functions result from execution of the code by one or more processors, such as a microprocessor, application-specific integrated circuit (ASIC), graphics processor, or a field-programmable gate array (FPGA). Alternatively, or in combination, the functions and operations can be implemented using special-purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places including, for example, ROM, volatile RAM, non-volatile memory or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD-ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or components, a mobile device, a user terminal, a vehicle, a personal communications device, a wearable digital device, an electronic kiosk, a general-purpose computer, an electronic document reader, a tablet, a laptop computer, a smartphone, a digital camera, a domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, or a combination of communication connections.

In some embodiments, the computing device is a system including one or more processing devices. Examples of the processing device can include a microcontroller, a central processing unit (CPU), special purpose logic circuitry (e.g., an FPGA, an ASIC, etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

We claim:

1. A method comprising:
generating a set of sentences based on a document;
predicting a set of labels for each sentence using a multi-label classifier, the multi-label classifier including a self-attended contextual word embedding backbone layer, a bank of trainable unigram convolutions, a bank of trainable bigram convolutions, and a fully connected layer, the multi-label classifier trained using a weakly labeled data set; and
labeling the document based on the set of labels.

2. The method of claim 1, wherein generating a set of sentences based on a document comprises:
splitting the document based on a split condition to form the set of sentences;
linking a plurality of entities to their corresponding mentions included in the set of sentences; and
discarding a first subset of the set of sentences that do not include an entity in the plurality of entities.

3. The method of claim 2, wherein generating a set of sentences based on a document further comprises filtering the set of sentences based on a preconfigured length.

4. The method of claim 1, wherein predicting a set of labels for each sentence using a multi-label classifier comprises:
extracting self-attended word embeddings for a respective sentence in the set of sentences using the self-attended contextual word embeddings from a second last layer of a transformer-based model;
inputting the self-attended word embeddings to the bank of trainable unigram convolutions;
inputting the self-attended word embeddings to the bank of trainable bigram convolutions; and
concatenating a first output from the bank of trainable unigram convolutions with a second output from the bank of trainable bigram convolutions to form a concatenated output.

5. The method of claim 4, wherein the first output is input into a first max pooling layer and the second output is input into a second max pooling layer prior to concatenating.

6. The method of claim 4, further comprising inputting the concatenated output to at least one fully connected layer, the at least one fully connected layer generating a set of labels for a given sentence.

7. The method of claim 1, wherein the multi-label classifier is trained by:
generating sentence embeddings for a set of sentences appearing in documents;
sub-sampling the sentence embeddings using one or more clustering routines, wherein sub-sampling the sentence embeddings generates sub-samples of sentence embeddings;
generating a test data set based on the sub-samples of sentence embeddings;
generating a training data set using a plurality of labeling functions based on knowledge constraints;
training the multi-label classifier using the word embeddings extracted from a second last layer of a transformer-based model of the extracted training data set; and
cross-validating the multi-label classifier using the test data set.

8. A non-transitory computer-readable storage medium for tangibly storing computer program instructions capable of being executed by a computer processor, the computer program instructions defining steps of:

generating a set of sentences based on a document;

predicting a set of labels for each sentence using a multi-label classifier, the multi-label classifier including a self-attended contextual word embedding backbone layer, a bank of trainable unigram convolutions, a bank of trainable bigram convolutions, and a fully connected layer the multi-label classifier trained using a weakly labeled data set; and labeling the document based on the set of labels.

9. The non-transitory computer-readable storage medium of claim 8, wherein generating a set of sentences based on a document comprises:

splitting the document based on a split condition to form the set of sentences;

linking a plurality of entities to their corresponding mentions included in the set of sentences; and discarding a first subset of the set of sentences that do not include an entity in the plurality of entities.

10. The non-transitory computer-readable storage medium of claim 9, wherein generating a set of sentences based on a document further comprises filtering the set of sentences based on a preconfigured length.

11. The non-transitory computer-readable storage medium of claim 8, wherein predicting a set of labels for each sentence using a multi-label classifier comprises:

extracting self-attended word embeddings for a respective sentence in the set of sentences using the self-attended contextual word embeddings from a second last layer of a transformer-based model;

inputting the self-attended word embeddings to the bank of trainable unigram convolutions;

inputting the self-attended word embeddings to the bank of trainable bigram convolutions; and concatenating a first output from the bank of trainable unigram convolutions with a second output from the bank of trainable bigram convolutions to form a concatenated output.

12. The non-transitory computer-readable storage medium of claim 11, the steps further comprising inputting the concatenated output to at least one fully connected layer, the at least one fully connected layer generating a set of labels for a given sentence.

13. The non-transitory computer-readable storage medium of claim 12, wherein the multi-label classifier is trained by:

generating sentence embeddings for a set of sentences appearing in documents;

sub-sampling the sentence embeddings using one or more clustering routines, wherein sub-sampling the sentence embeddings generates sub-samples of sentence embeddings;

generating a test data set based on the sub-samples of sentence embeddings;

generating a training data set using a plurality of labeling functions based on knowledge constraints;

training the multi-label classifier using the word embeddings extracted from a second last layer of a transformer-based model of the extracted training data set; and cross-validating the multi-label classifier using the test data set.

14. The non-transitory computer-readable storage medium of claim 11, wherein the first output is input into a first max pooling layer and the second output is input into a second max pooling layer prior to concatenating.

15. A device comprising:

a processor configured to:

generate a set of sentences based on a document;

predict a set of labels for each sentence using a multi-label classifier, the multi-label classifier including a self-attended contextual word embedding backbone layer, a bank of trainable unigram convolutions, a bank of trainable bigram convolutions and a fully connected layer the multi-label classifier trained using a weakly labeled data set; and label the document based on the set of labels.

16. The device of claim 15, wherein generating a set of sentences based on a document comprises:

splitting the document based on a split condition to form the set of sentences;

linking a plurality of entities to their corresponding mentions included in the set of sentences; and discarding a first subset of the set of sentences that do not include an entity in the plurality of entities.

17. The device of claim 16, wherein generating a set of sentences based on a document further comprises filtering the set of sentences based on a preconfigured length.

18. The device of claim 15, wherein predicting a set of labels for each sentence using a multi-label classifier comprises:

extracting self-attended word embeddings for a respective sentence in the set of sentences using the self-attended contextual word embeddings from a second last layer of a transformer-based Universal Sentence Encoder;

inputting the self-attended word embeddings to the bank of trainable unigram convolutions;

inputting the self-attended word embeddings to the bank of trainable bigram convolutions; and concatenating a first output from the bank of trainable unigram convolutions with a second output from the bank of trainable bigram convolutions to form a concatenated output.

19. The device of claim 18, the processor further configured to input the concatenated output to at least one fully connected layer, the at least one fully connected layer generating a set of labels for a given sentence.

20. The device of claim 15, wherein the multi-label classifier is trained by:

generating word embeddings for a set of sentences appearing in documents;

sub-sampling the sentence embeddings using one or more clustering routines, wherein sub-sampling the sentence embeddings generates sub-samples of sentence embeddings;

generating a test data set based on the sub-samples of sentence embeddings;

generating a training data set using a plurality of labeling functions based on knowledge constraints;

training the multi-label classifier using the word embeddings extracted from a second last layer of a transformer-based model of the extracted training data set; and cross-validating the multi-label classifier using the test data set.

\* \* \* \* \*